(12) United States Patent
Jing et al.

(10) Patent No.: US 7,809,840 B2
(45) Date of Patent: Oct. 5, 2010

(54) SYSTEM AND METHOD OF ENABLING TCP SPLICE WITH A CONTENT-BASED CHARGING PROXY

(75) Inventors: Jin Jing, West Roxbury, MA (US); Jie Wang, Westford, MA (US); Soon Teck Gibson Ang, Nashua, NH (US)

(73) Assignee: Alcatel Lucent, Paris (FR)

( * ) Notice: Subject to any disclaimer, the term of this patent is extended or adjusted under 35 U.S.C. 154(b) by 528 days.

(21) Appl. No.: 11/555,696

(22) Filed: Nov. 2, 2006

(65) Prior Publication Data

US 2008/0109554 A1    May 8, 2008

(51) Int. Cl.
    *G06F 15/16*    (2006.01)
(52) U.S. Cl. .................. 709/227; 709/203; 709/245
(58) Field of Classification Search .................. 709/203, 709/225, 226, 238, 245; 707/E17.12, 100; 711/100, 118
    See application file for complete search history.

(56) References Cited

U.S. PATENT DOCUMENTS 6,857,009 B1 *   2/2005  Ferreria et al. .............. 709/219

2005/0086342 A1 *   4/2005  Burt et al. .................. 709/224
2006/0190609 A1 *   8/2006  Chetuparambil et al. .... 709/228

* cited by examiner

*Primary Examiner*—Frantz B Jean
(74) *Attorney, Agent, or Firm*—Capitol Patent & Trademark Law Firm, PLLC

(57) ABSTRACT

A system and method of enabling transmission control protocol (TCP) splice between a client application and a server, while maintaining control of the connections by a content-based charging proxy. The system framework includes a TCP splicing module for splicing connections between a client application and a server, an application proxy (e.g., content-based charging proxy) for redirecting a request of the client application, and a content-based charging engine for determining the classification of the data flow between the client application and the server. If the data flow has a predetermined classification or a triggering event has been detected, the content-based charging engine transfers control of the connections to the application proxy. The application proxy, for example, can redirect the client application to a predetermined service or source based on the classification of the data flow.

14 Claims, 8 Drawing Sheets

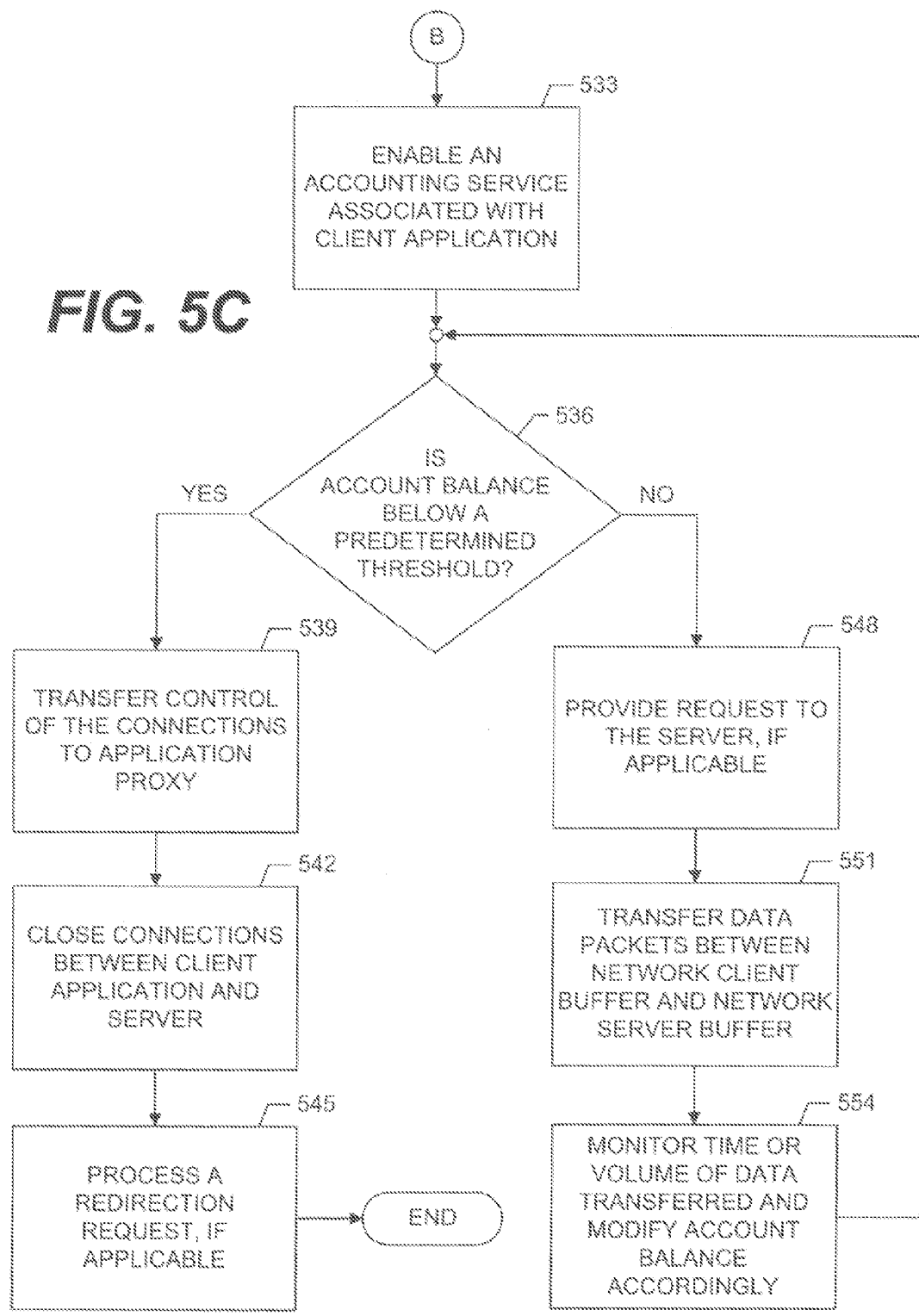

SYSTEM AND METHOD OF ENABLING TCP SPLICE WITH A CONTENT-BASED CHARGING PROXY

TECHNICAL FIELD

The present invention relates generally to a system and method of enabling transmission control protocol (TCP) splice with a content-based charging proxy, and, in particular, to a system and method of enabling TCP splice with a content-based charging proxy, such that control of a connection is transferred to the proxy when a predetermined triggering event occurs.

BACKGROUND OF THE INVENTION

Generally, communication protocols have been adopted to connect client systems with server systems on the Internet. One of the main protocols for transmitting data over networks to the transmission control protocol/internet protocol (TCP/IP). While the internet protocol (IP) deals typically with the transfer of packets, the transmission control protocol (TCP) enables two computer systems to establish a connection and exchange streams of data. TCP ensures dependable delivery of the data and guarantees that data packets will be delivered in the same order as originally sent.

A TCP connection between a client and a server may be split at various points, such as at domain boundaries or at Internet service provider (ISP) servers. Many web-based services utilize split-connection proxies, such as firewalls, gateways for mobile hosts, and stream transducers. In traditional implementation, proxy servers utilize application modules to transfer data between the client and server connections. Unfortunately, such application modules required substantial overhead for handling the significant number of active TCP connections within the user space.

To lower the overhead of split-connection proxies, a TCP splice module was introduced, thereby eliminating the duplicative copying of data between buffers at network and application layers that incurred for each packet exchanged between corresponding client and server endpoints. The utilization of the TCP splice module conserves the usage of state management resources by closing connection sockets in the application after the TCP splice is established. The TCP splice module transfers data from the server to the client directly through the IP-layer or the socket layer in the network kernel space.

In a basic interaction mode, an HTTP proxy application can exploit TCP splice by receiving and processing the client request (e.g., HTTP GET or HTTP CONNECT), establishing the connection to the server, forwarding the request to the server, and invoking the TCP splice for the two connections. Typically, the TCP splice module or service provides for the bidirectional transfer of data between the two connections, until one of the endpoints (e.g., the client or the server) closes its connection.

Although the TCP splice module provides advantages for many web-based services, there currently is not efficient way to enable TCP splice for a content-based charging (CBC) proxy. A CBC proxy generally extends the traditional split-connection proxies with additional services that provide for accounting the volume (or time) of data transferred through the proxy for each client or user and redirecting a client request (GET or CONNECT) if the volume (or time) of transferred data exceeds the limit allowed by the user's pre-pay account.

Applying the TCP splice module or service to a CBC proxy introduces several issues, because the use of content-based charging requires the CBC proxy to control redirecting of a client request, for example, when accessing a website with an access charge or when an account balance of a customer falls below a predetermined threshold. Existing TCP splice solutions are either (1) connection-based, as the splicing is established after the socket connections become available and the application relinquishes control of the connections completely after splicing, or (2) request-based, as the splicing of the TCP connections occurs on a request-by-request basis. Unfortunately, a connection-based TCP splice module does not provide a mechanism or facility to allow the CBC proxy to regain control of the connections for processing a redirection request, for example, at the application layer, while a request-based TCP splice module does not provide for the optimization of state management resources, such as file descriptors for opened-stock connections.

What is needed is a system and method of enabling TCP splice connections with a content-based charging proxy, while allowing the CBC proxy to regain control of the connections if a particular triggering event occurs. It is to such a system and method that the present invention is primarily directed.

BRIEF SUMMARY OF THE INVENTION

Briefly described, in preferred form, the present invention is a system and method of enabling transmission control protocol (TCP) splice between a client application and a server, while maintaining control of the connections by a content-based charging proxy. Generally, the system framework includes a TCP splicing module for splicing connections between a client application and a server, an application proxy (e.g., content-based charging proxy) for redirecting a request of the client application, and a content-based charging engine for determining the classification of the data flow between the client application and the server. If the data flow has a predetermined classification or a triggering event has been detected, the content-based charging engine transfers control of the connections to the application proxy. The application proxy, for example, can redirect the client application to a predetermined service or source based on the classification of the data flow.

The content-based charging engine is further adapted to determine whether an account balance associated with the client application is below a predetermined threshold. If the account balance is determined to be below the predetermined threshold, then the content-based charging engine transfer control of the connections between the client application and the server to the application proxy. Moreover, the content-based charging engine can monitor the time or volume of transferred data between the client application and the server and, therefore, modify the accounting balanced based on the monitored time or balance. For example, a particular period of time or volume of data may cost a certain amount, which is then debited from the account balance associated with the client application.

In addition to splicing connections between the client application and the server, the TCP splicing module typically transfer data packets between the client application and the server. More particularly, the TCP splicing module transfers data packets between a network server buffer and a network client buffer of a network layer. The TCP splicing module, therefore, maintains the connections between the client application or the server until the connection are closed or the content-based charging engine transfers control of the connections to the application proxy.

Generally, the classification of the data flow as determined by the content-based charging engine can include a variety of classifications including, but not limited to, a no-charge flow classification (e.g., free flow classification), a redirection flow classification (e.g., a flow requiring redirection), and a charge flow classification (e.g., content-based charging flow classification). Based on the data flow classification, the present invention handles the connections between the client application and the server in various manners, as described more fully above.

The method of enabling TCP splice connections while maintaining proxy control includes receiving a request from a client application, establishing TCP splice connections between the client application and the server, determining a classification of the data flow associated with the request, and providing the request to the server, if the classification of the data flow is unrestricted or transferring control of the connections to the application proxy, if a triggering event has occurred. The application proxy may then process a redirection request, so that the client application is directed to a different service or source.

The method can further include the enabling of an accounting service for modifying an account balance associated with the client application, determining whether the account balance is below a predetermined threshold, and transferring control of the connections to the application proxy, if the account balance is below the predetermined threshold. Further, the data flow may be blocked by closing the connections between the client application and the server, when the determination is made that the account balance is below the predetermined threshold.

These and other objects, features and advantages of the present invention will become more apparent upon reading the following specification in conjunction with the accompanying drawings.

BRIEF DESCRIPTION OF THE FIGURES

FIGS. 5A-5C, collectively known in FIG. 5, illustrate a logic flow diagram representing a method of enabling a TCP splice with a content-based charging proxy in accordance with preferred embodiments of the present invention.

DETAILED DESCRIPTION OF THE PREFERRED EMBODIMENTS

Figure 1:
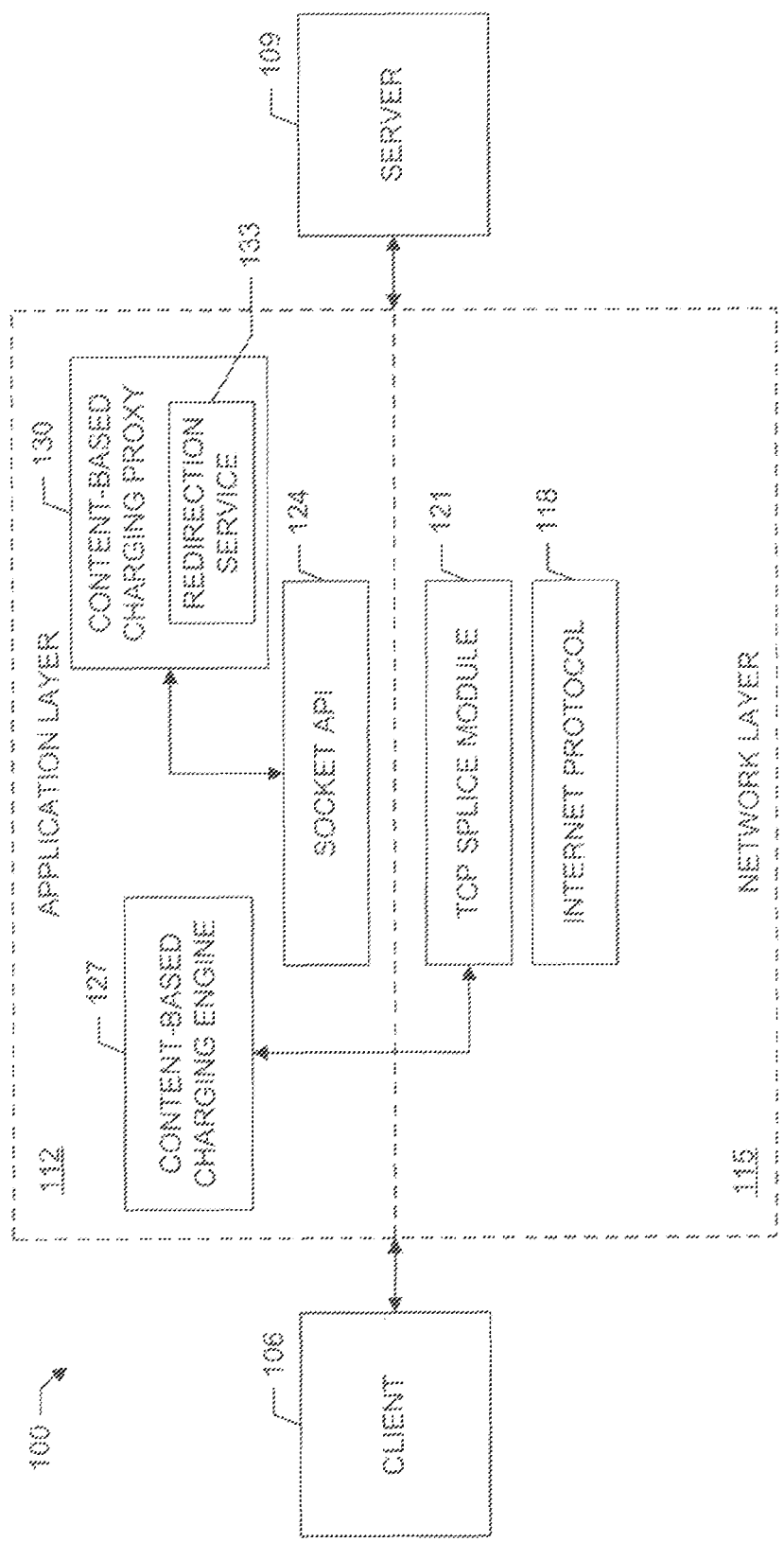
FIG. 1 illustrates a block diagram representation of component structures of a framework or system for enabling TCP splice with a content-based charging proxy in accordance with preferred embodiments of the present invention.

Referring now in detail to the drawing figures, wherein like reference numerals represent like parts throughout the several views, FIG. 1 displays component structure of a system 100 for enabling TCP splice with a content-based charging (CBC) proxy 130. The system 100 provides a framework for implementing a TCP splice with a CBC proxy 130, while maintaining control of the connections for the CBC proxy 130, so that a redirection request can be processed, if necessary. In operation, the present invention retains the advantages of using TCP splice, such as lowering the overhead of split-connection proxies, while preserving the necessary functionality of the CBC proxy 130 utilized in a content-based charging environment.

As illustrated in FIG. 1, a client system 106, or application thereon, desires to communicated, generally over a network, with a particular server 109. In the content-based charging environment, the client system 106 can be associated with a financial account, whereby certain, but not necessarily all, content-based services provided to the client system 106 are paid for by or charged to the financial account. As described more fully below, some content-based services may be free, while other content-based services may have an associated charge rate dependent on the volume or duration (time) of transferred data provided to or sent from the client system 106. For example, when the account balance associated with the client system 106 falls below a predetermined threshold, the flow of content or data to and from the client system 106 should be halted, and control of the connections between the client system 106 and the server 109 should be transferred to an application proxy 130, so that a redirection request, if applicable, can be processed.

As is known by one skilled in the art, communication between the client system 106 and the server 109 generally use traditional protocols, whereby data can be transferred through an application layer 112 and a network layer 115. Generally, a socket application program interface (API) 124 is utilized in the application layer 112 to establish socket connections between the client system 106 and the server 109, while an internet protocol 118 is utilized for transferring data over the network layer 115.

To facilitate communications between the client system 106 and the server 109 within a content-based charging environment, the system 100 of the present invention generally comprises a TCP splicing module 121, an application proxy 130 (e.g., CBC proxy 130), and a content-based charging engine 127 (e.g., CBC engine 127). The TCP splicing module 121 is adapted to splice connections between the client application 106 and the server 109, thereby reducing unnecessary overhead caused by duplicate copying of data packets between buffers. Typically, the TCP splicing module 121 transfers data packets between the network server buffer and the network client buffer during the communication session between the client application 106 and the server 109.

The CBC proxy 130 is adapted to redirect, if necessary, a request from the client application 106. The redirection of the request can be to a predetermined server or service, such as, but not limited to, a service allowing a user associated with the client system 106 to add funds to a corresponding account balance. As described more fully below, the CBC proxy 130 controls the connections between the client system 106 and the server 109 depending on the content type of the data flow. The CBC proxy 130 can include a redirection service 133 adapted to perform or process the redirection request of the client system 106. The redirection service 133 allows the CBC proxy 130 to redirect the client system 106 to a predetermined service or server upon a particular triggering event.

The CBC engine 127 determines the classification of the data flow between the client application 106 and the server 109. Based on the classification of the data flow or other triggering factor, the CBC engine 127 can transfer control of the connections between the client application 106 and the server 109 to the CBC proxy 130 for potential redirection.

The classifications for data flow can be generally categorized as restricted and unrestricted classifications. An unrestricted classification of data flow within the content-based charging environment generally indicates that the type of request from the client application 106 and the data transferred between the client application 106 and the server 109 is generally free (no-charge). If the CBC engine 127 determines that the data flow is unrestricted or free, then the CBC engine 127 instructs the CBC proxy 130 that there exists no reason for redirection and the CBC proxy 130, therefore, relinquishes control of the connections. Accordingly, data can flow between the client system 106 and the server 109 without charge or interruption. If the data flow is classified as unrestricted or free, the TCP splicing module 121 maintains the connections between the client application 106 and the server 109, so that data can be freely transferred without charge or regulation.

A restricted classification indicates that the data flow may need to be redirected for a predetermined reason, such as, but not limited to, an Advice of Charge (AOC) (e.g., advice to the user that a charge will apply for the requested service), advice to the user of a banned site in which the user is trying to access, the account associated with the user is out of credit for the charged flow, and other reasons for redirection. If the classification of the data flow is a redirection flow (e.g., a flow requiring redirection), then the CBC engine 127 transfers control of the connections to the CBC proxy 130 for proper redirection. If, however, the classification of the data flow is a charge flow, then the TCP splicing module 121 maintains the connections between the client application 106 and the server 109 until the CBC engine 127 determines that the account balance associated with the client system 106 is below a predetermined threshold. Once the CBC engine 127 makes such a determination, the CBC engine 127 can transfer control of the connections to the CBC proxy 130. For example, the client system 106 may be redirected by the CBC proxy 130 to a service where the user of the client system 106 can add funds to the associated financial account.

Further, the CBC engine 127 can determine whether an account balance associated with the client application 106 is below a predetermined threshold. If the CBC engine 127 determines that the account balance is indeed below a predetermined threshold, then the CBC engine 127 can transfer control of he connections between the client application 106 and the server 109 to the CBC proxy 130 for processing.

In an exemplary embodiment of the present invention, the CBC engine 127 is integrally coupled to the TCP splice module 121, such that the CBC engine 127 can monitor the volume or duration (time) of transferred data between the client application 106 and the server 109. Accordingly, the CBC engine 127 can directly or indirectly modify the account balance associated with the client system 106 based on the monitored volume or duration (time) of transferred data. In other words, the CBC engine 127 can charge the user of the client system 106 for use of content-based services based on duration of the service or the amount of data exchanged. One skilled in the art will recognize that the CBC engine 127 may communicate charges to the CBC proxy 130, such that the CBC proxy 130 directly or indirectly modifies the account balance associated with the client system 106.

Advantageously, the system 100 of the present invention performs CBC accounting tasks (via the CBC engine 127 and CBC proxy 130) at the network layer 115, so that the application proxy 130 (e.g., CBC proxy 130) can fully take advantage of the TCP splice module's 121 capabilities. The CBC engine 127 provides necessary services so that the application proxy 130 can relinquish control of the connections as early as possible. In an exemplary embodiment of the present invention, the application proxy 130 can relinquish control of the connections if the data flow is classified as free of charge and/or for non-persistent connections. Further, the CBC engine 127 allows the TCP splice module 121 to return the control of the connections back to the application proxy 130 for processing a redirection request, if applicable.

For example and not limitation, Table 1 provides various function calls utilized by the TCP splice module 121, CBC engine 127, and CBC proxy 130 for performing the various tasks described herein. The provided function calls within Table 1 provide further description of the functionality of the various components of the present invention. One skilled in the art will recognize that additional function calls may be necessary to implement the present invention, but are enabled by the present description.

TABLE 1

Exemplary Function Calls

| FUNCTION CALL | DESCRIPTION |
| --- | --- |
| splice(A,B) | A typical TCP Splice procedure moves data packets between the two sockets through simple manipulations of the network receive and send buffers. Splice(A,B) directly moves data packets between a network server buffer to a network client buffer. |
| getFlowId(client_request) | Returns a flow id of each client request, which is required by the CBC Engine to check flow classification, preform accounting, and check account balance. |
| flowClassification(flow_id) | Returns the type of each data flow. The returned type can be one of the following classifications: redirection_flow, CBC_flow_with_charging_rate, and free_flow. |

TABLE 1-continued

Exemplary Function Calls

| FUNCTION CALL | DESCRIPTION |
| --- | --- |
| accountingRegister(flow_id) | Allows for the registering of a flow_id to enable accounting for data passing through the flow with the particular flow_id. |
| accountBalanceCallBackRegister(flow_id, call_back_function, balance_threshold) | Registers a call back function for the CBC Engine to call back when the account balance is below a predetermined threshold. |
| isFreePDPContext(socket) | Checks if the socket is a free PDPContext call. If so, all data access is free of charge and requires no redirection service. |
| isPersistentConnection(socket) | Checks if the socket is open for a persistent connection. |
| getRedirectURL(client_request) | Returns a redirected URL if one exists. Otherwise, returns a null value. A request could be redirected for an "Advice of Charge" or because there is not enough credit in the account. |

Further, for exemplary purpose only, Table 2 provides pseudocode utilizing the function calls provided in Table 1 that illustrates the functionality of the CBC proxy 130 and redirection service 133 using the TCP splicing module 121.

TABLE 2

Exemplary Pseudocode for CBC Proxy Using TCP Splice Module

```
c = accept( ) /* client connection */
while (!isConnectionClosed(c)) {
    client_request = read(c); /* request from client */
    redirect_URL = getRedirectURL(client_request);
    if (redirect_URL != NULL) { /* This is a redirect request */
        /* write to client the redirectURL and status code */
        write(c, redirect_URL, redirect_status_code);
        break; /* get out and then close the sockets */
    } else { /* This is a non-redirect request */
        s = socket( );
        connect(s); /* server socket and connection */
        write(s, client_request); /* forward request to server */
        splice(s, c); /* splicing between s and c */
        if (isFreePDPContext(c) || !isPersistentConnection(c)) {
            break; /* get out and then close the sockets */
        }
    }
}
if (c != NULL) close(c);
if (s != NULL) close(s);
```

One skilled in the art will recognize that the socket API 124, internet protocol 118, TCP slice module 121, CBC engine 127, CBC proxy 130 and components thereof are configured with hardware and/or software appropriate to perform the tasks and provide capabilities and functionality as described herein.

Figure 2:
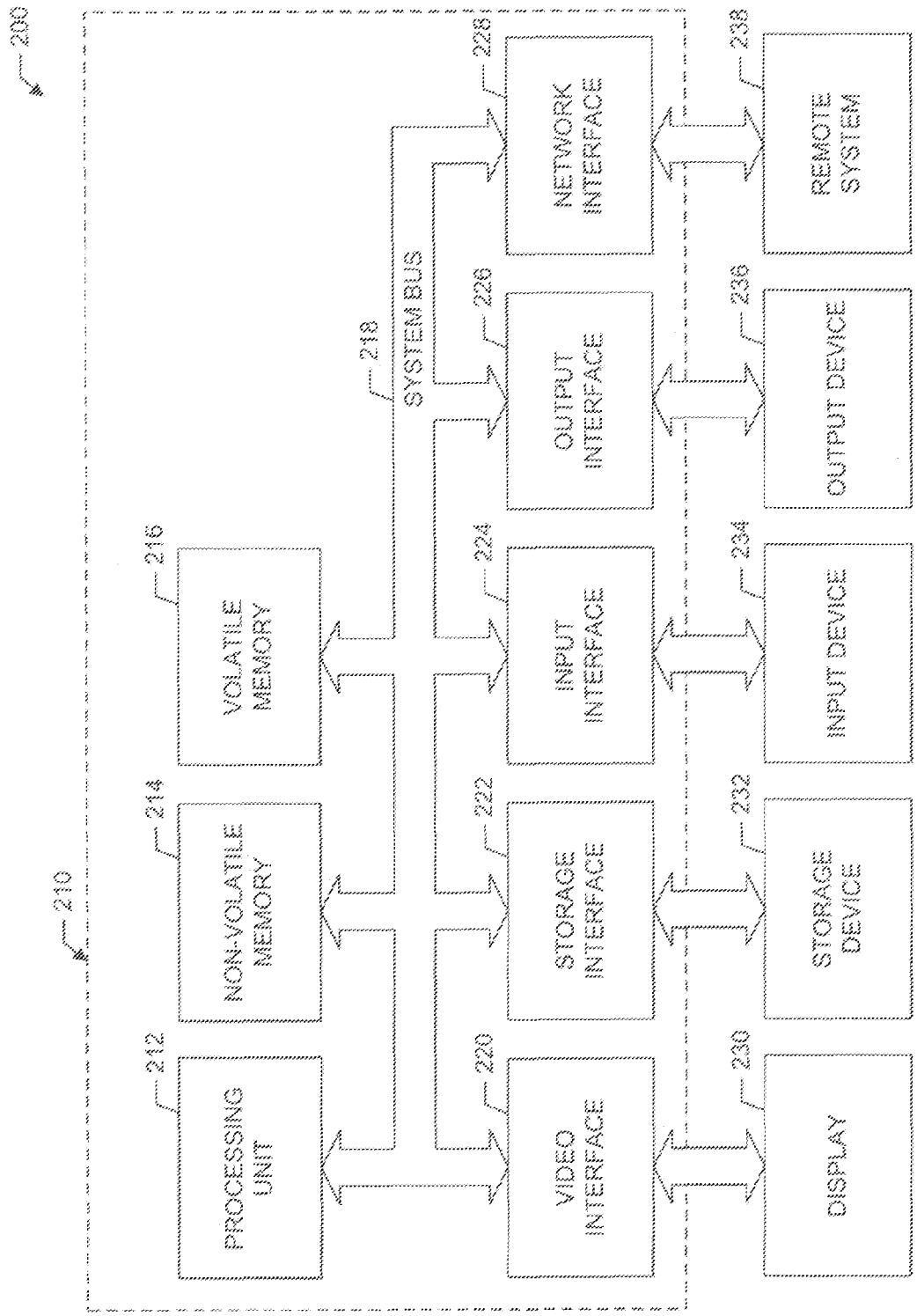
FIG. 2 illustrates a block diagram representation of a computing environment which may be utilized in accordance with preferred embodiments of the present invention.

FIG. 2 displays a block diagram representation of a computing environment 200 which may be utilized in accordance with preferred embodiments of the present invention. More particularly, client system 106 and server 109 can utilize the computing environment 200 described herein. The client system 106 and server 109 of the present invention can include, but are not limited to, personal computers, mainframe computers, servers, hand-held or laptop devices, cellular phones, multiprocessor systems, microprocessor-based systems, set-top boxes, programmable consumer electronics, network PCs, minicomputers, distributed computing environments that include any of the above systems or devices, and the like. It should be understood, however, that the features and aspects of the present invention can be implemented by or into a variety of systems and system configurations and any examples provided within this description are for illustrative purposes only.

FIG. 2 and the following discussion provide a general overview of a platform onto which an embodiment of the present invention, or portions thereof, can be integrated, implemented and/or executed. Although reference has been made to instructions within a software program being executed by a processing unit, those skilled in the art will understand that at least some of the functions performed by the software can also be implemented by using hardware components, state machines, or a combination of any of these techniques. In addition, a software program which may implement an embodiment of the present invention can also run as a stand-alone program or as a software module, routine, or function call, operating in conjunction with an operating system, another program, system call, interrupt routine, library routine, or the like. The term program module is used herein to refer to software programs, routines, functions, macros, data, data structures, or any set of machine readable instructions or object code, or software instructions that can be compiled into such, and executed by a processing unit 212.

Turning now to the figure, computing device 210 may comprise various components including, but not limited to, a processing unit 212, a non-volatile memory 214, a volatile memory 216, and a system bus 218. The non-volatile memory 214 can include a variety of memory types including, but not limited to, read only memory (ROM), electronically erasable read only memory (EEROM), electronically erasable and programmable read only memory (EEPROM), electronically programmable read only memory (EPROM), electronically alterable read only memory (EAROM), FLASH memory, bubble memory, battery backed random access memory (RAM), compact disc read only memory (CDROM), digital versatile disc (DVD), or other optical disk storage, magnetic cassettes, magnetic tape, magneto-optical storage devices, magnetic disk storage or other magnetic storage devices, of any other medium which may be used to store the desired information. The non-volatile memory 214 can provide storage for power-on and reset routines (bootstrap routines) that are invoked upon applying power or resetting the computing device 210. In some configurations the non-volatile memory 214 can provide the basic input/output system (BIOS) routines that are utilized to perform the transfer of information between elements within the various components of the computing device 210.

The volatile memory 216 can include a variety of memory types and devices including, but to limited to, random access memory (RAM), dynamic random access memory (DRAM), synchronous dynamic random access memory (SDRAM), double data rate synchronous dynamic random access memory (DDR-SDRAM), bubble memory, registers, or the like. The volatile memory 216 can provide temporary storage for routines, modules, functions, macros, data, etc. that are being or may be executed by, or are being accessed or modified by, the processing unit 212.

Alternatively, the non-volatile memory 214 and/or the volatile memory 216 can be a remote storage facility accessible through a distributed network system. Additionally, the non-volatile memory 214 and/or the volatile memory 216 can be a memory system comprising a multi-stage system of primary and secondary memory devices, as described above. The primary memory device and secondary memory device can operate as a cache for each other or the second memory device can serve as a backup to the primary memory device. In yet another embodiment, the non-volatile memory 214 and/or the volatile memory 216 can comprise a memory device configured as a simple database file or as a searchable, relational database using a query language, such as SQL.

The computing device 210 can access one or more external display devices 230 such as a CRT monitor, LCD panel, LED panel, electro-luminescent panel, or other display device, for the purpose of providing information or computing results to a user. In some embodiments, the external display device 230 can actually be incorporated into the product itself. For example, the computing device 210 can be a mobile device having a display device 230. The processing unit 212 can interface to each display device 230 through a video interface 220 coupled to the processing unit 210 over the system bus 218.

In operation, the computing device 210 sends output information to the display 230 and to one or more output devices 236 such as a speaker, modem, printer, plotter, facsimile machine, RF or infrared transmitter, computer or any other of a variety of devices that may be controlled by the computing device 210. The processing unit 212 can interface to each output device 236 through an output interface 226 coupled to the processing unit 212 over the system bus 218.

The computing device 210 an receive input or commands from one or more input devices 234 such as, but not limited to, a keyboard, pointing device, mouse, modem, RF or infrared receive, microphone, joystick, track ball, light pen, game pad, scanner, camera, computer or the like. The processing unit 212 may interface to each input device 234 through an input interface 224 coupled to the processing unit 212 over the system bus 218.

It will be appreciated that program modules implementing various embodiments of the present invention can be stored in the non-volatile memory 214, the volatile memory 216, or in a remote memory storage device accessible through the output interface 226 and the input interface 224. The program modules can include an operating system, application programs, other program modules, and program data. The processing unit 212 can access various portions of the program modules in response to the various instructions contained therein, as well as under the direction of events occurring or being received over the input interface 224.

The computing device 210 can provide data to and receive data from one or more other storage devices 232, which can provide volatile or non-volatile memory for storage and which can be accessed by computing device 210. The processing unit 212 can interface to each storage device 232 through a storage interface 222 over the system bus 218.

The interfaces 220, 222, 224, 226, and 228 can include one or more of a variety of interfaces, including but not limited to, cable modems, DSL, T1, T3, optical carrier (e.g., OC-3), V-series modems, and RS-232 serial port interface or other serial port interface, a parallel port interface, a universal serial bus (US), a general purpose interface bus (GPIB), an optical interface such as infrared or IrDA, an RF or other wireless interface such as Bluetooth, and the like.

Figure 3:
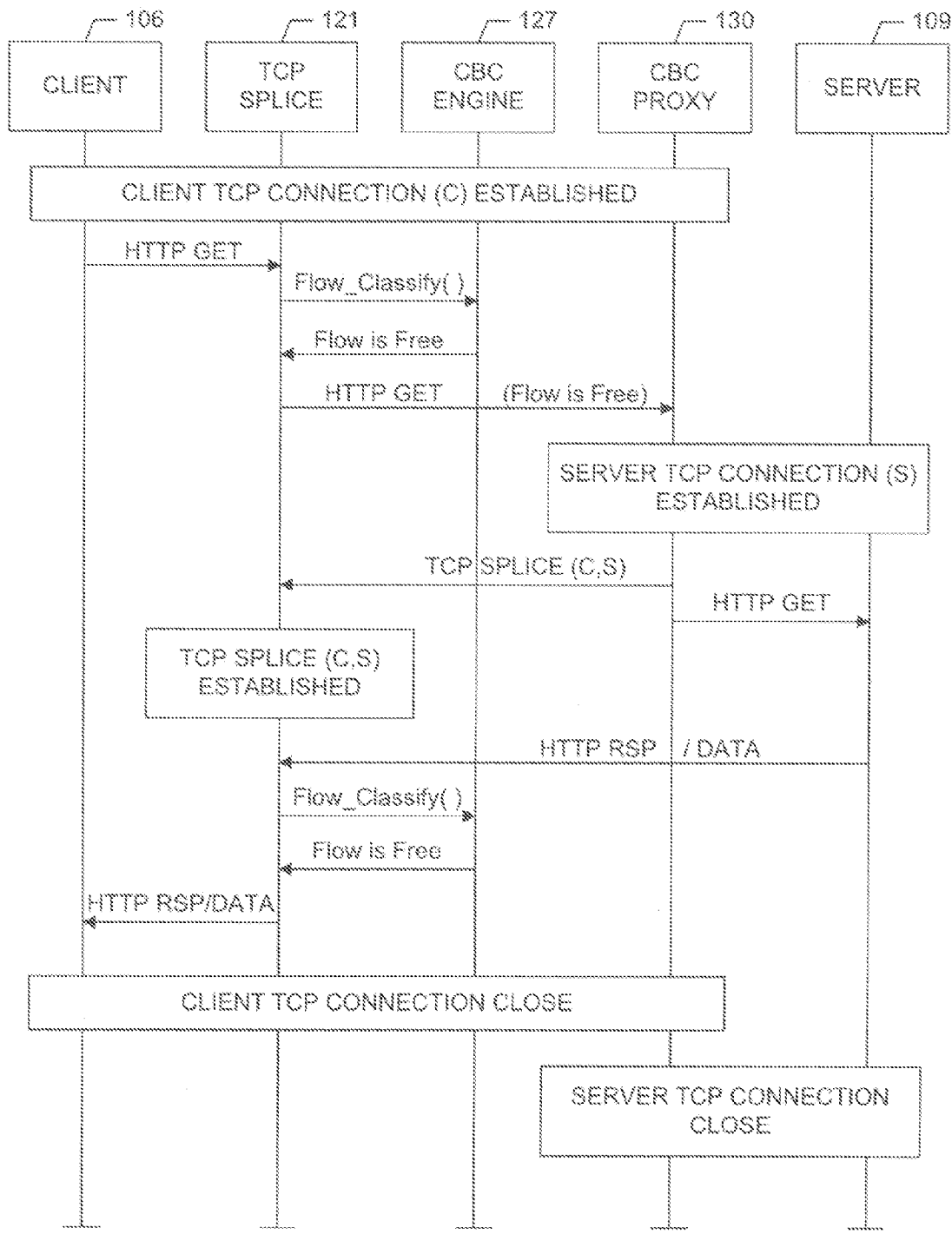
FIG. 3 illustrates a block diagram representation of a call flow between a client application and server where the data flow is classified as unrestricted or free in accordance with preferred embodiments of the present invention.

For exemplary purposes only, FIGS. 3 and 4 illustrate call flows within the system 100 of the present invention without and with a redirection scenario, respectively. FIG. 3 illustrates a call flow 300 between a client application 106 and a server 109 where the data flow is classified as unrestricted or free. Generally, a client TCP connection is established between the client system 106, TCP splice module 121, CBC engine 127, and CBC proxy 130. The client system 106 provides a request (for example an HTTP GET request) which is received by the TCP splice module 121. The TCP splice module 121 communicates with the CBC engine 127 in order to acquire the classification of the data flow. The CBC engine 127 determines the classification of the data flow and provides the classification to the TCP splice module 121. In the example provided in FIG. 3, the data flow classification is unrestricted or free.

The TCP splice module 121 then provides the request from the client to the CBC proxy 130, indicating that the classification of the data flow from the client is unrestricted or free. The CBC proxy 130 permits the connection with the requested server 109, thereby establishing a server TCP connection between the CBC proxy 130 and server 109. The CBC proxy 130 then requests a spice of the client TCP connection and the server TCP connection from the TCP splice module 121 and provides the client request from the client 106 to the server 109.

The TCP splice module 121 established the splice between the client and server connections. The server 109 provides a response and/or data (e.g., HTTP RSP/DATA) to the TCP splice module 121, based on the received client request. The TCP splice module 121 then communicates with the CBC engine 127 to determine the classification of the data flow from the server 109. The CBC engine 127 provides the classification of the data flow from the server 109 to the TCP splice module 121. In this example, the classification of the data flow from the server 109 is unrestricted or free. Accordingly, the TCP splice module 121 provides the data or response from the server 109 to the requesting client application 106.

Figure 4A:
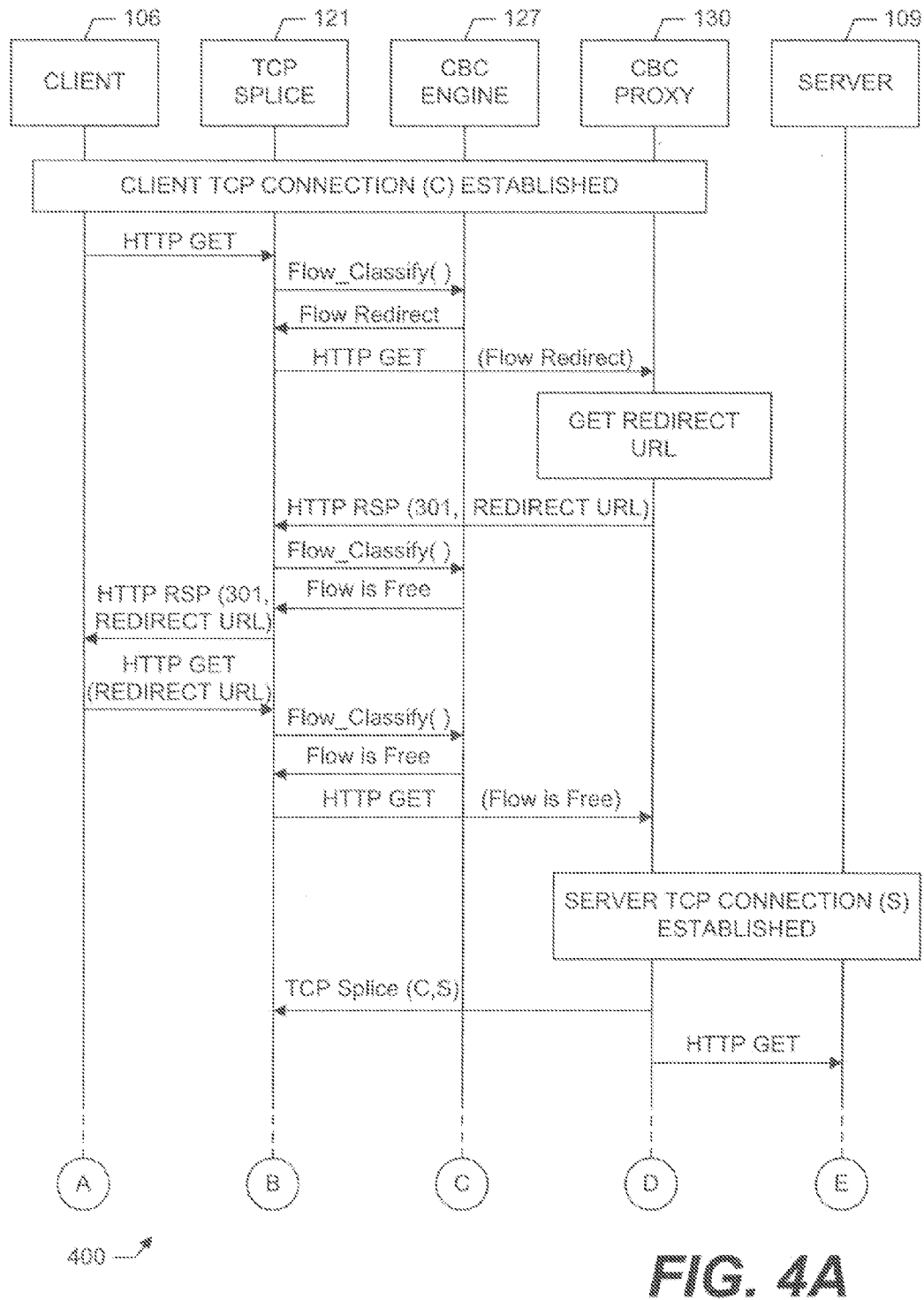
FIGS. 4A-4B, collectively known as FIG. 4, illustrates a block diagram representation of a call flow between a client application and a server where the data flow is classified as a flow requiring redirection in accordance with preferred embodiments of the present invention.
Figure 4B:
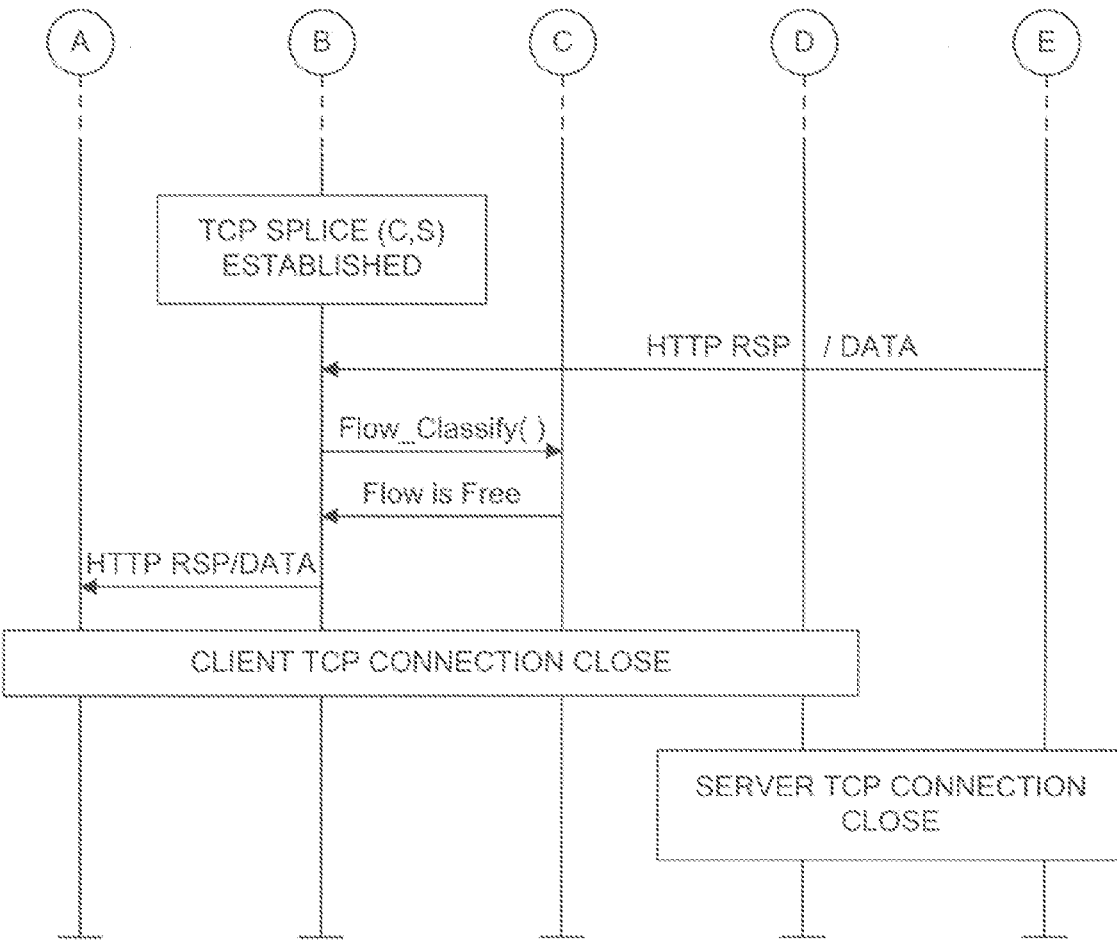

FIGS. 4A-4B, collectively known as FIG. 4, illustrate a call flow 400 between a client application 106 and a server 109 where the data flow is classified as a flow requiring redirection. Generally, a client TCP connection is established between the client system 106, TCP splice module 121, CBC engine 127, and CBC proxy 130. The client system 106 provides a request (e.g., an HTTP GET request) which is received by the TCP splice module 121. The TCP splice module 121 communicates with the CBC engine 127 in order to acquire the classification of the data flow. The CBC engine 127 determined the classification of the data flow and provides the classification to the TCP splice module 121. In the example provided in FIG. 4, the data flow classification is a redirect.

The TCP splice module 131 then provides the request from the client to the CBC proxy 130, indicating that the classification of the data flow from the client is a redirect. The CBC proxy 130 utilized the redirection service 133 to get the redirect uniform resource locator (URL) associated with the particular data flow. The CBC proxy 130 then provides a response to the request, such that the redirect URL is provided, to the TCP splice module 121. The TCP splice module 121 asks the CBC engine 127 to classify the response received from the CBC proxy 130. The CBC engine 127 recognizes the response as a redirection and, therefore, classifies the response as unrestricted or free. The CBC engine 127 provides the classification to the TCP splice module 121.

The TCP splice module 121 then provides the response with the redirect URL to the client application 106. Generally, the client application 106 automatically generates a new request using the redirection URL provided (e.g., HTTP GET (REDIRECT URL)). The new request is provided to the TCP splice module 121.

The TCP splice module 121 communicates with the CBC engine 127 in order to acquire the classification of the data flow of the new request. The CBC engine 127 determines the classification of the data flow with redirect and provides the classification to the TCP splice module 121. In this example, the data flow with redirect is classified as unrestricted or free.

The TCP splice module 121 then provides the redirect request from the client to the CBC proxy 130, indicating that the classification of the data flow from the client is unrestricted or free. The CBC proxy 130 permits the connection with the requested (redirect) server 109, thereby establishing a server TCP connection between the CBC proxy 130 and redirect server 109. The CBC proxy 130 then requests a splice of the client TCP connection and the server TCP connection from the TCP splice module 121 and provides the client request to the server 109.

The TCP splice module 121 established the splice between the client and server connections. The service 109 provides a response and/or data (e.g., HTTP RSP/DATA) to the TCP splice module 121, based on the received client redirect request. The TCP splice module 121 then communicates with the CBC engine 127 to determine the classification of the data flow from the server 109. The CBC engine 127 provides the classification of the data flow from server 109 to the TCP splice module 121. In this example, the classification of the data flow from the server 109 is unrestricted or free. Accordingly, the TCP splice module 121 provides the data or response from the server 109 to the requesting client application 106.

Figure 5A:
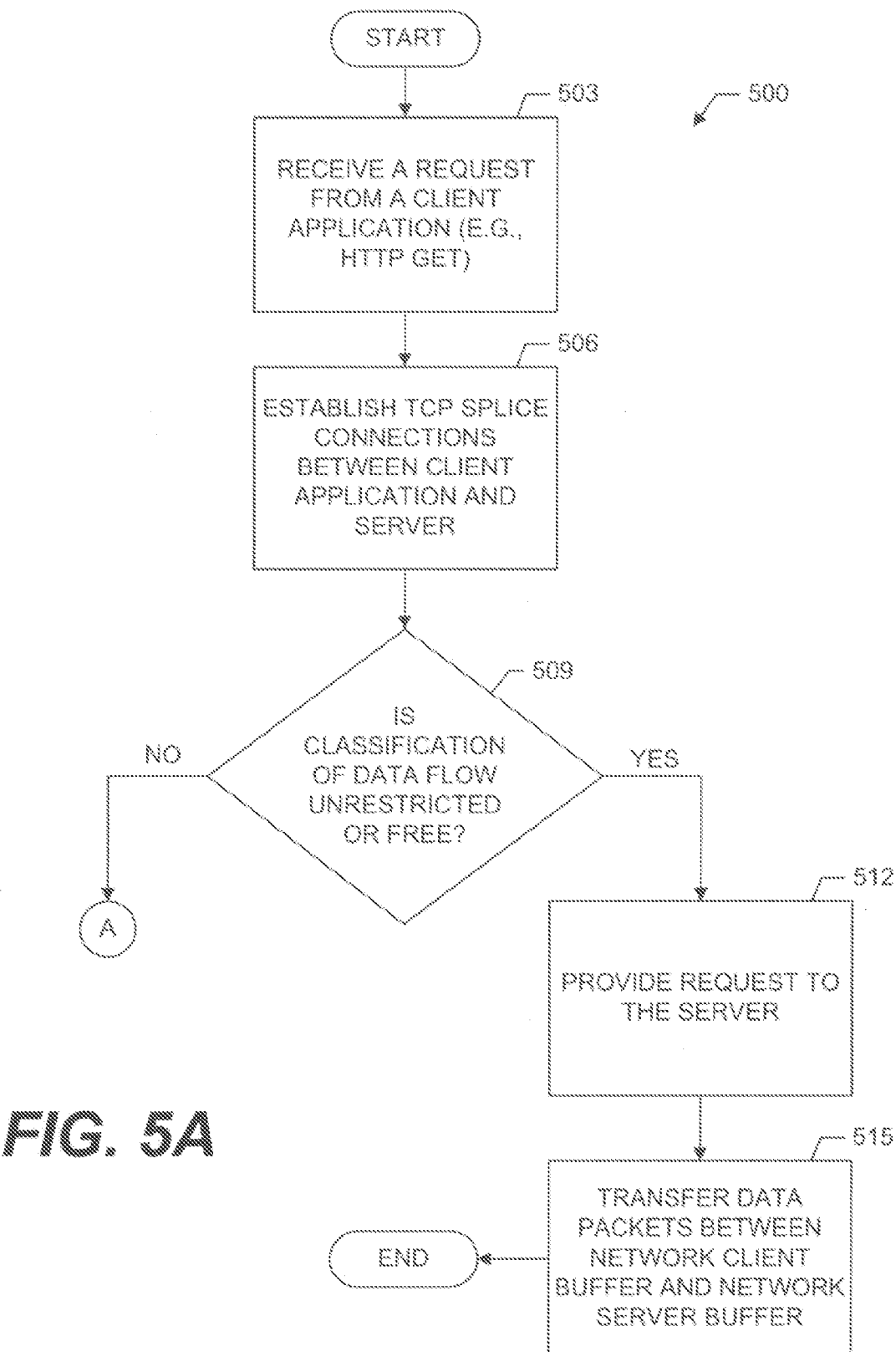
Figure 5B:
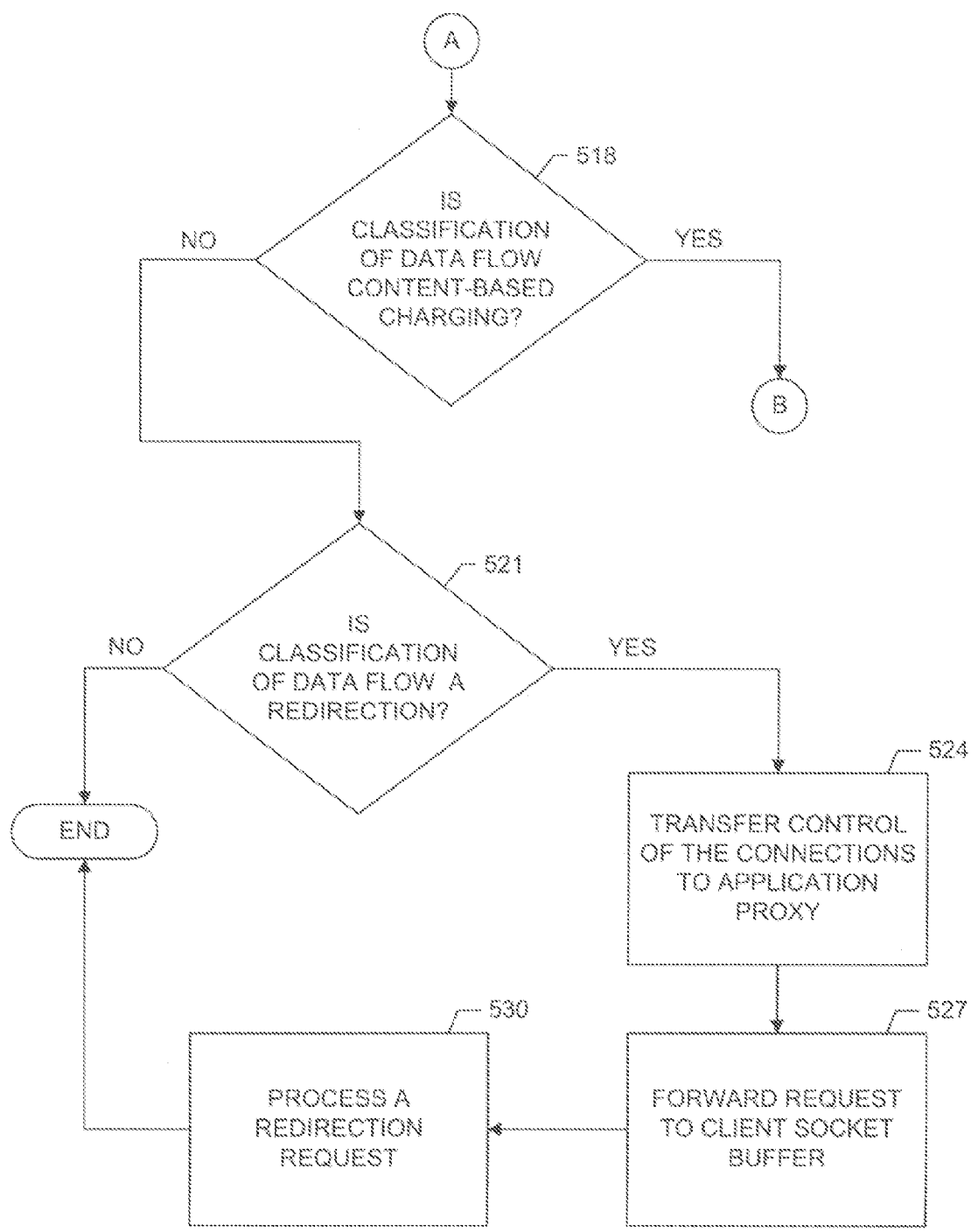

FIGS. 5A-5C, collectively known as FIG. 5, illustrate a logic flow diagram representing a method 500 of enabling a TCP splice with a CBC proxy 130 in accordance with preferred embodiments of the present invention. The method 500 of the present invention allows the application proxy 130 is regain control of the connections between the client 106 and the server 109 whenever necessary for processing a redirection request. The method 500 further optimizes the use of state management resources by closing socket connections of the client application 106 for non-persistent connection and free of charge PDP content, while keeping connections for only those that may require the redirection in a persistent connection.

More specifically, the method 500 of enabling a TCP splice with a CBC proxy 130 begins at 503 where the TCP Splice module 121 receives a request from a client application 106 (e.g., an HTTP GET). The TCP Splice module 121 can then establish TCP splice connections at 506 between the client application 106 and the server 109 via the CBC Proxy 130. The TCP splice module 121 can receive data flow from the client application 106 and the server 109. When the TCP splice module 121 receives any request or data flow, the TCP splice module 121 asks at 509 the CBC engine 127 to classify the data flow.

The CBC engine 127 determines the classification of the data flow provided by the TCP splice module 121. If, at 509, the CBC engine 127 determines that the data flow classification is unrestricted or free, then the TCP splice module 121 permits the transfer of data between the client 106 and server 109, such as by allowing the request from the client 106 to be provided to the server 109 by the CBC proxy 130, at 512. Next, at 515 the TCP splice module 121 transfers data packets between the network client buffer and the network server buffer. After the transfer of data is completed, method 500 of the present invention is terminated.

If, at 509, the classification of the data flow is not unrestricted or free, then the data flow is restricted as either a charge flow or a redirection flow (e.g., a flow requiring redirection). At 518, if the CBC engine 127 determines that the data flow is a charge flow, then the CBC engine 127 at 533 enables an accounting service associated with the client application 106. The accounting service accesses an account balance associated with the user of the client application 106.

Next, at 536, the CBC engine 127 determines whether the account balance is below a predetermined threshold. If the account balance is not below the predetermined threshold, then the TCP splice module 121 provides the request (or data) to the server 109 (or client 106, depending on the direction of data flow) at 548 via the CBC proxy 130. The TCP splice module 121 then, at 551, allows for the transfer of data packets between the network client buffer and the network server buffer. During the transfer of data between the client 106 and the server 109, the CBC engine 127 monitors duration (time) or volume of data transferred and modifies the account balance accordingly (e.g., based on a predetermined charge rate). The CBC engine 127 then determines, at 536, whether the account balance is below a predetermined threshold.

If the CBC engine 127 determines that the account balance is below a predetermined threshold, then, at 539, the CBC engine 127 instructs the TCP splice module 121 to transfer control of the connections to the application proxy 130. The TCP splice module 121, at 542, may also close the connections between the client application 106 and the server 109. Next, at 545, the CBC proxy 130 processes a redirection request, if applicable. The client application 106 is then redirected to a predetermined server or service. Method 500 then terminates in accordance with the present invention.

If, however, at 518, the CBC engine 127 determined that the data flow is not classified as a charge flow, then at 521 the CBC engine 127 determines whether the classification of the data flow is a flow requiring redirection. If, at 521, the CBC engine 127 does not classify the data flow as a flow requiring redirection, then the method 500 terminates in accordance with the present invention. Otherwise, at 524, the CBC engine 127 instructs the TCP splice module 121 to transfer control of the connections to the application proxy 130. Then, at 527, the request is forwarded to the client socket buffer. The CBC proxy 130, at 530, processes the redirection request. The client application 106 is the redirected to a predetermined server or service. Method 500 then terminates in accordance with the present invention.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangements of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A system for enabling transmission control protocol (TCP) splice connections between a client application and a server while maintaining proxy control, the system comprising:
   a TCP splicing module for splicing connections between the client application and the server;
   an application proxy for redirecting a request of the client application; and
   a content-based charging engine adapted to determine the classification of a data flow between the client application and the server, the classifications including a no-charge classification, a redirection classification, and a charge classification, wherein the content-based charging engine transfers control of the connections to the application proxy if the data flow has a predetermined classification, and
   wherein the TCP splicing module maintains the connections between the client application and the server until the content-based charging engine determines whether an account balance associated with the client application is below a predetermined threshold when the data flow is determined to have the charge classification, such that control over the connection is transferred to the application proxy when the account balance is below the predetermined threshold.

2. The system of claim 1, wherein the content-based charging engine is further adapted to monitor a volume of transferred data between the client application and the server and modify the account balance based on the monitored volume of transferred data.

3. The system of claim 1, wherein the content based charging engine is further adapted to determine a period of time in which data is transferred between the client application and the server and modify the account balance based on the determined period of time.

4. The system of claim 1, wherein the TCP splicing module is further adapted to transfer data packets between a network server buffer and a network client buffer.

5. The system of claim 1, wherein the TCP splicing module maintains the connections between the client application and the server if the data flow is determined to have the no-charge classification.

6. The system of claim 1, wherein the content-based charging engine transfers control of the connections to the application proxy if the data flow is determined to have the redirection classification.

7. A method for enabling transmission control protocol (TCP) splice connections while maintaining proxy control, the method comprising:
   receiving a request from a client application;
   establishing TCP splice connections between the client application and a server;
   providing the request to the server;
   determining whether a triggering event has occurred, wherein the triggering event is related to a type of content of a data flow associated with the request, by enabling an accounting service for modifying an account balance associated with the client application, and determining whether the account balance is below a predetermined threshold; and
   if the account balance is below the predetermined threshold, transferring control of the connections to an application proxy, blocking the data flow by closing the connections between the client application and the server, and processing a redirection request by the application proxy.

8. The method of claim 7, wherein providing the request to the server includes transferring data packets between a network client buffer and a network server buffer.

9. The method of claim 7, wherein transferring control of the connections to an application proxy includes forwarding the request to a client socket buffer.

10. The method of claim 7, further comprising:
    processing a redirection request by the application proxy, if the triggering event has occurred.

11. A method for enabling a transmission control protocol (TCP) splice connection while maintaining proxy control, the method comprising:
    receiving a request having a data flow from a client application;
    establishing TCP splice connections between the client application and a server;
    determining a classification of the data flow associated with the request;
    if the data flow is classified as a free flow, maintaining the connections between the client application and the server;
    if the data flow is classified as a flow requiring redirection, forwarding the request to a client socket buffer and transferring control of the connections to an application proxy;
    if the data flow is classified as a content-based charging flow, performing a sequence comprising:
        determining whether an account balance associated with the client application is below a predetermined threshold;
        if the account balance is not below the predetermined threshold, maintaining the connections between the client application and the server; and
        if the account balance is below the predetermined threshold, closing the connections between the client application and the server.

12. The method of claim 11, further comprising:
    transferring control of the connections to an application proxy, if the account balance is below the predetermined threshold.

13. The method of claim 11, further comprising:
    processing a redirection request by the application proxy.

14. The method of claim 11, further comprising:
    enabling an accounting service for modifying the account balance associated with the client application.

* * * * *